Jan. 1, 1924

J. S. CHOUNIS

VEGETABLE CUTTER AND SLICER

Filed Sept. 17, 1923

Inventor
James S. Chounis
By A. F. Robinson
Attorney

Jan. 1, 1924
J. S. CHOUNIS
VEGETABLE CUTTER AND SLICER
Filed Sept. 17, 1923
1,479,369
2 Sheets-Sheet 2
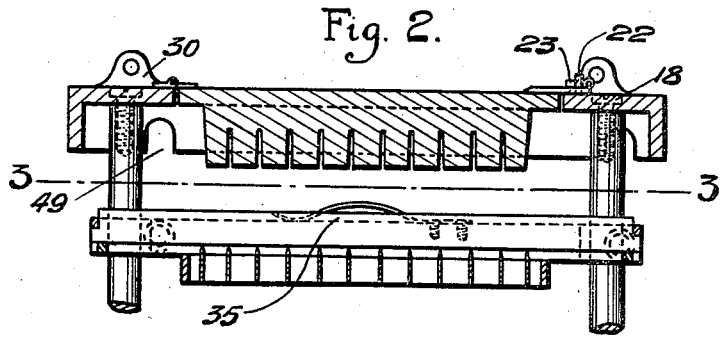
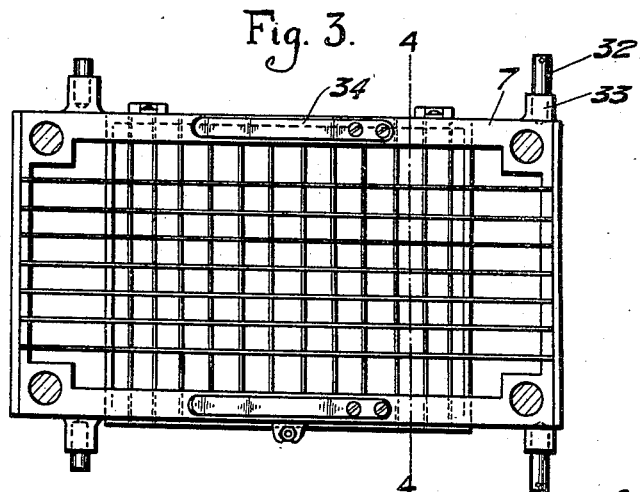
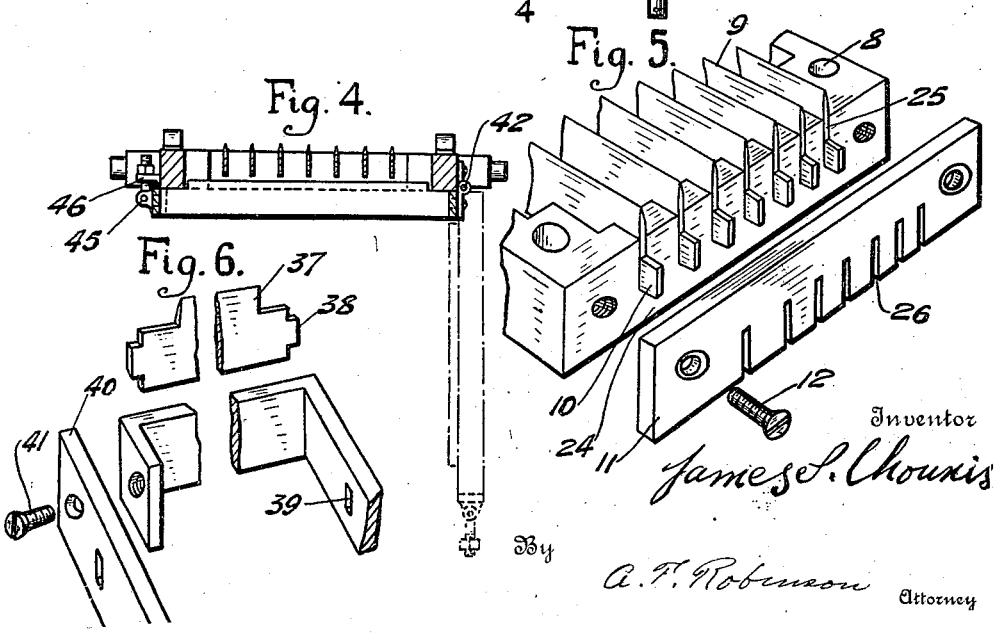
Inventor
James S. Chounis
By
A. F. Robinson
Attorney Patented Jan. 1, 1924.

1,479,369

UNITED STATES PATENT OFFICE.

JAMES S. CHOUNIS, OF CHARLESTON, WEST VIRGINIA.

VEGETABLE CUTTER AND SLICER.

Application filed September 17, 1923. Serial No. 663,139.

*To all whom it may concern:*

Be it known that I, JAMES S. CHOUNIS, a citizen of Greece, residing at Charleston, in the county of Kanawha and State of West Virginia, have invented new and useful Improvements in Vegetable Cutters and Slicers, of which the following is a specification.

The present invention relates to vegetable cutters and slicers adapted for use in cuisines where it is readily accessible for use in cutting and preparing vegetables in any desired manner.

I am fully aware that various and sundry vegetable cutters have heretofore been devised but they, as a general rule, are objectionable for the reason that the vegetables to be sliced are placed upon the base and the knives are then forced against them thus causing the sides of the vegetables next to the base to be bruised, or else the vegetables are placed on the knives and the base is then forced against them with the same objectionable results as above mentioned.

My invention contemplates the construction of a cutter which is devised to be free from the above objection.

More specifically stated, the objects of my invention are:

(1) To construct a vegetable cutter in such a manner that the vegetables are placed upon the movable knives and forced against a stationary base;

(2) To construct the knives so that each individual blade is readily insertible and removable but which is positively held against accidental displacement;

(3) To construct the base so that it is readily accessible for cleaning without disengaging the same from the standards;

(4) To construct the lever mechanism so that it will uniformly operate both ends of the movable cutting frame without causing it to bind upon the standards;

(5) To construct a device having the above-described characteristics and which will permit the finished products, the sliced vegetables, to fall away from it by their own weight and be removed for use without disturbing the machine proper;

(6) To construct a cutting device in such a manner that the lever mechanism is practically within the area of the four standards substantially as described.

The invention further comprehends the provision of a simple, efficient construction and arrangement of parts and other features of novelty hereinafter more fully described, reference being had to the accompanying drawings which form a part of this application and in which:

Fig. 2 shows a cross-sectional view of the right angularly cross-slotted lid or block and of the two sets of blades at right angles to each other.

Fig. 3 is a top plan view of the knives and knife-carrying frames as seen from the open-top end of the machine at 3—3 of Fig. 2.

Fig. 4 is a view, partly sectional and partly diagrammatic, taken on line 4—4 of Fig. 3 and showing the two sets of knives hinged and locked together, and also the position of the lower set of knives when not in use.

Fig. 5 is an end view of the upper knife-carrying frame showing the knife-locking piece detached and the manner in which said knives are fastened to the frame.

Fig. 6 is a perspective view of the various elements used to fasten the knives on the lower knife-carrying frame.

Figure 1:
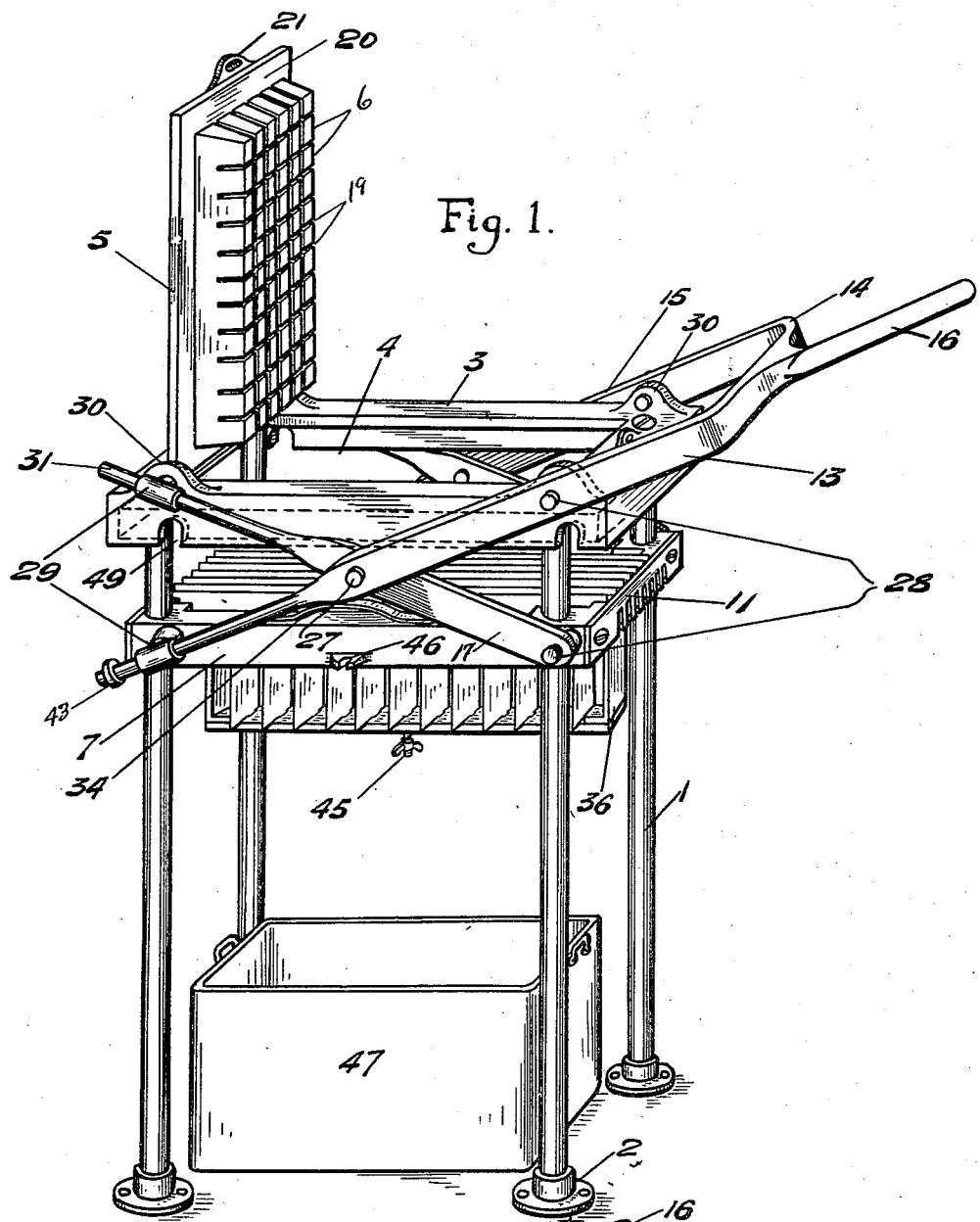
Fig. 1 is a pictorial view of the machine, with all of its parts assembled and its top raised.

Referring now more specifically to the drawings wherein corresponding numerals are used to designate similar parts in the different views, the cutter is fixed upon four legs or standards 1 which may be attached to the floor or table by means of screws insertible through apertures on the web shoes 2. There is fixed upon the top of the standards 1 an open frame 3 which may be attached to the top ends of the standards by means of set screws 18 threaded into holes formed in the top of the legs as is clearly shown in Fig. 2.

Hinged to the frame 3 by any suitable means is a lid 5, the underside of which is provided with a thick block-like surface which is cross-slotted to form series of alternating tooth-like projections 6 and recesses 19. The lid 5 is provided with a marginal flange 20 extending around its perimeter.

This lid is further provided with an apertured ear 21. When the lid 5 is closed on the frame 3 the flange 20 will lie flat upon the top surface of the frame and the apertured ear 21 will fit over a projecting lug 22 formed on the frame 3 and locked thereon by a wedge-key 23, while the toothed block will project below the opening 4 of the frame 3, all of which is clearly shown in Fig. 2 of the drawings.

The numeral 7 designates the rectangular frame which carries the horizontally arranged blades 9. This frame is provided at its opposite ends with recesses 25 into which fit the kerfed ends 10 of the blades 9. The steps on the ends of the blades project beyond the ends 24 of the frame and are held against accidental displacement therefrom by a locking plate 11 which is adapted to be fastened to the end of the frame 7 by means of screws 12, and is provided with slots 26 into which fit the ends of the blades 9 in a manner shown in Fig. 1.

The frame 7 is further provided at each corner with apertures 8 through which extend the standards 1 and permit said frame to have a reciprocatory movement vertically upon the standards.

A lever and fulcrum mechanism generally designated by numeral 13 which consists of a tuning-fork shaped member 14 having two parallel arms 15 and a handle 16, and two bars 17, each of which is pivotally connected respectively to each of the parallel arms 15 of the tuning-fork shaped member 14 at 27 by any suitable means.

The lever and fulcrum mechanism is attached to the machine proper by the pivotal connections 28 and 29 shown in Fig. 1. The pivotal connections 28 are effected on the frame 3 by means of studs passing through the apertured ears 30 and the corresponding apertures in the arms 15, and the connections 29 are made on the frame 3 by means of tubular T-members, the stems of which are rotatively mounted in the apertures of the ears 30 and the tubular cross bars of which receive the ends 31 of the bars 17 and permit same to slide to and fro therein. Similar connections are made between the remaining ends of the lever and fulcrum mechanism and the knife-carrying frame 7 by means of the reduced end portions 32 of the projections 33 carried thereby. On the reduced ends of arms 15 are placed the limiting means 43. This may be placed upon one or both of the arms 15 and 31 or any one of them and fastened by welding or any desired means.

On the top of the sides of frame 7 are mounted resilient shock-absorbing springs 34 which seat in depressions 35 for a purpose which will be made apparent hereafter.

When it is desired to cut the vegetable products into cubes or blocks, instead of long slices, I have provided a frame 36 which carries knives similar to those carried by frame 7 but the knives on frame 36 are arranged at right angles to the knives of frame 7. Frame 36 is hingedly connected to frame 7 by any suitable means 42 such as shown in Fig. 4 and may be brought into operative position by clamping it up against frame 7 and holding it in this position by means of the interlocking elements 45 and 46.

The knives 37 are fastened into the frame 36 in a somewhat similar manner to the knives 9 which are fastened into frame 7, that is, the knives 37 are provided at their ends with projections 38 which are adapted to fit into apertures 39 in the sides of the frame. The front side 40 of the frame is made removable and is held in place by means of screws 41. This arrangement not only securely locks the blades in place but permits easy removal of same, either for repair or for the purpose of cutting larger slices or cubes. The frame 36 may, when not in use, be allowed to hang down into an inoperative position as shown by the dotted lines in Fig. 4, or, if desired, the same may be entirely removed.

Underneath the knives and between the upright standards may be placed a receptacle 47 for the purpose of receiving the sliced products.

Figure 7:
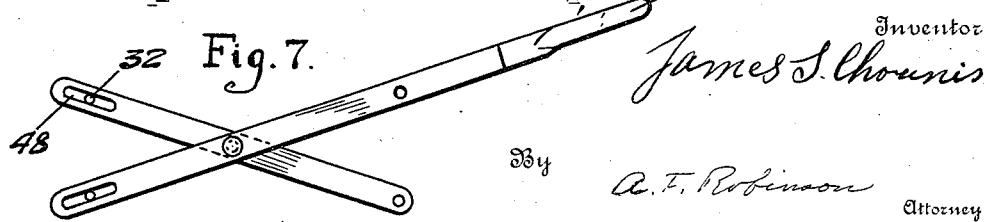
Fig. 7 shows an alternative construction of the lever arms and the manner of attaching same in operative relation to the machine.

The lever and fulcrum or toggle mechanism 14 may be modified as shown in Fig. 7, that is, instead of using the hollow cylindrical loop 29 shown in Fig. 1, the corresponding ends of the arms and bars may be slotted as shown at 48 and thus operate on a stud 32. With this arrangement the limiting means 43, shown on the end of the arm 15 will not be needed, neither will there be any need for the rotative members 29.

It is further to be noted that the frame 3 has its depending flange cut away in the manner and form shown at 49 (Fig. 1.) for the purpose of accommodating the projecting arms 33 on the frame 7, thus permitting the frame and knives to pass up farther into the cross-cut block so that even when both sets of knives are used the outer edges of the lower set of knives will be flush with the outer surfaces of the teeth on the block, making it impossible for any particles of vegetables to stick either to the knives or to the block, but the same will be cut clean and every particle will be forced to drop into the receptacle below.

The leaf springs 34 serve the dual function of absorbing the shock and cause the cutting elements to ease gently upon the vegetables and avoid bruising them and prevent seizing of the toggle or lever and fulcrum mechanism. These springs, being seated in depressions 35, are prevented from hindering the knives from coming into intimate contact with the block but will permit the knife-carrying frame 7 to go right up to the underneath side of the frame 3.

The operation and use of my device is made apparent from the above description. The vegetable products, such as potatoes, onions, beets, etc., are first peeled and prepared for cutting. They are then placed upon the first series of knives 9 either through the opening 4 of the frame 3 by lifting open the lid 5 or, if desired, the lid can be kept closed and the vegetables thrown in from either end of the frame 7. Then, the lid being closed, one presses downwardly on the handle 16 and the lever and fulcrum mechanism will carry the knives (either one or both sets, as desired) up until the vegetables strike the block when the knives will be forced through the vegetables and sever them into pieces that will fall into the receptacle below. The knives and handle will return to their normal positions by force of gravity and the operation may be repeated.

It will thus be apparent from the foregoing description and illustrations in the accompanying drawings that I have devised a new and useful vegetable slicer, one which is simple in construction and operation, durable and efficient in service, and one which can be cheaply manufactured and sold at a reasonable price, and it will be useful in any place where cooking is done, whether in large or small quantities.

It is obvious that while I have above described what I have found to be a very practical embodiment of my invention, the specific details of construction and configuration of parts described herein may be modified in various ways without sacrificing the advantages of the invention or departing from the scope thereof as defined in the appended claims.

What I claim as my own invention and desire to secure by Letters Patent of the United States is:

1. A vegetable cutter comprising a plurality of vertical standards, an open top frame fixed upon the top of said standards, a cross-slotted block hinged to the open frame, and a knife-carrying frame adapted to reciprocate upon the standards.

2. A vegetable cutter comprising a plurality of vertical standards, an open top frame fixed on the top of the standards, a cross-slotted block hinged to the open top frame, a rectangular knife-carrying frame adapted to reciprocate on the standards, a system of levers attached to the two frames for the purpose of moving the knife-carrying frame to and from the said cross-slotted block.

3. In a device of the character described, a plurality of standards, an open top frame attached to the standards and having projecting studs on its side, a cross-slotted block hingedly connected to one end of said open top frame and adapted to close the opening of the same, a movable knife-carrying frame cut away to engage the standards and having projecting studs on its side, a lever mechanism pivoted to the projecting studs on the open top frame and the knife carrying frame, and resilient means carried by the knife carrying frame adapted to abut the said open top frame and aid the return movement of the knife carrying frame.

4. A knife carrying frame formed with a plurality of slots on each end, a series of blades having a protruding stud on each end and seating in the slots on the said knife carrying frame, a slotted plate engaging the protruding studs of the blades and clamped to the knife carrying frame to lock the blades in place.

5. A knife carrying frame formed with a plurality of slots on each end, blades insertible in said slots and their ends projecting beyond the ends of the knife carrying frame, a locking plate engaging the projecting ends of the blades and clamped to the knife carrying frame.

6. In a device of the character described, an open top frame fixed to the tops of a plurality of standards, a cross-slotted block hinged to said open top frame and forming a closure therefor, a knife carrying frame on which the vegetable products are placed slidable upon the standards below the open top frame, a lever mechanism connected to the two frames and adapted to lift the knife carrying frame towards the cross-slotted block and force the knives thru the vegetables products and into the slots of the said cross-slotted block.

7. In a device of the character described comprising a plurality of standards and a stationary open top frame attached at the tops of same, a cross-slotted block hinged to said open top frame and forming a closure therefor, a forked lever arm pivoted to one end of the open top frame and having a pivotal connection with the opposite end of the knife carrying frame and another arm pivoted to the lever arm intermediate the standards and having a pivotal engagement with the knife carrying frame and a sliding pivotal connection with the opposite end of the fixed open frame.

8. A knife carrying frame comprising slotted ends, a plurality of blades insertible in the slotted ends, projecting ears on the blades, a locking plate slotted on its under surface and adapted to fit over the ears on the blades to prevent accidental displacement.

9. A pair of knife carrying frames hinged together and arranged one above the other with the blades of one frame at right angles to the blades of the other frame, the lower knife carrying frame depending from the upper knife carrying frame by means of a hinge when the said lower frame is in an inoperative position.

10. A pair of knife carrying frames hinged together and placed one above the other with the knives at right angles, the hinge holding the lower knife carrying frame into an inoperative position, and the hinge and a catch mechanism holding the said lower knife carrying frame into an operative position.

In witness whereof I have hereunto set my hand, and subscribed my name.

JAMES S. CHOUNIS.